US006882551B2

(12) United States Patent
Shimada et al.

(10) Patent No.: US 6,882,551 B2
(45) Date of Patent: Apr. 19, 2005

(54) SWITCHING POWER SUPPLY DEVICE

(75) Inventors: Masaaki Shimada, Niiza (JP); Tomoyasu Yamada, Niiza (JP)

(73) Assignee: Sanken Electric Co., Ltd., Niiza (JP)

( * ) Notice: Subject to any disclaimer, the term of this patent is extended or adjusted under 35 U.S.C. 154(b) by 0 days.

(21) Appl. No.: 10/496,161

(22) PCT Filed: Nov. 28, 2002

(86) PCT No.: PCT/JP02/12436

§ 371 (c)(1), (2), (4) Date: May 20, 2004

(87) PCT Pub. No.: WO03/047080

PCT Pub. Date: Jun. 5, 2003

(65) Prior Publication Data

US 2005/0018458 A1 Jan. 27, 2005

(30) Foreign Application Priority Data

Nov. 29, 2001 (JP) ...................................... 2001-364350

(51) Int. Cl.[7] ............................................ H02M 7/155
(52) U.S. Cl. ........................................ 363/79; 363/89
(58) Field of Search ........................... 363/78, 79, 84, 363/89, 125

(56) References Cited

U.S. PATENT DOCUMENTS 5,617,305 A * 4/1997 Numata ....................... 363/16
5,959,857 A * 9/1999 Nagahara .................... 363/132
5,973,946 A * 10/1999 Yasumura ..................... 363/89
6,314,005 B1 * 11/2001 Nishi et al. .............. 363/21.08
6,373,735 B1 * 4/2002 Usui .......................... 363/89

FOREIGN PATENT DOCUMENTS

| | | |
|---|---|---|
| EP | 0 838 893 | 4/1998 |
| JP | 05-111246 | 4/1993 |
| JP | 2000-341936 | 12/2000 |
| JP | 2001-086737 | 3/2001 |
| JP | 2001-119940 | 4/2001 |

* cited by examiner

*Primary Examiner*—Adolf Berhane
(74) *Attorney, Agent, or Firm*—Brenda O. Holmes; Kilpatrick Stockton LLP

(57) ABSTRACT

A switching power supply such that the step-up ratio of when the power-factor is improved does not increase, and the conversion efficiency can be improved. In a case where the error voltage Ver outputted from a conductance amplifier (23) increases over a reference voltage Vref2, a switching signal of high level is outputted from a comparator (59) to a FET (57) to turn on the FET (57). Therefore a resistor (56) is bypassed, and as a result a reference voltage Vref1 inputted into the conductance amplifier (23) is changed from a reference voltage Vref1-1 to Vref1-2 of lower level. Further, since the variation of the error voltage Ver outputted from the conductance amplifier (23) decreases, the output voltage Vout also decreases.

9 Claims, 11 Drawing Sheets

SWITCHING POWER SUPPLY DEVICE

TECHNICAL FIELD

The present invention relates to a switching power supply to be used in electronic equipments. The invention particularly relates to the switching power supply which has a power-factor improvement function of improving conversion efficiency.

BACKGROUND ART

Switching power supply devices having a power-factor improvement converter are used in electronic equipments such as AC adapters, devices and equipments for office automation, and commercial-off-the-shelf equipments. For this reason, the switching power supply devices are adapted to harmonic current restraint (IEC/EN 61000-3-2), and harmonic restraint guidelines for electrical household appliances and multipurpose products. Further, in recent years, the efficiency of the switching power supply devices is desired in order to cope with the miniaturization and the energy saving of electronic equipments.

One example of step-up chopper circuits based on the harmonic current restraint is a device disclosed in Japanese Patent Application Laid-Open No. 5-111246 (1993). In FIG. 1, a power-factor improvement converter includes a rectifying circuit 2 using a diode bridge, a switching element 4 turned on/off by a control circuit 8, and a step-up reactor 3. While the step-up chopper circuit is making a peak current of the step-up reactor 3 track an input voltage, the switching element 4 is turned on/off so that an output voltage becomes constant. The step-up chopper circuit conforms to the harmonic current restraint by performing the switching operation in such a manner.

DISCLOSURE OF THE INVENTION

Such a step-up chopper circuit is generally stepped-up so that its output voltage Vout becomes:

$$Vout \geqq (\sqrt{2})Vin$$

with respect to a maximum value (×√2 times) of an alternating voltage of an actual input value Vin in order to perform the power-factor improvement operation. For this reason, as the input alternating voltage Vin becomes higher, the output voltage should be stepped-up to a higher voltage.

Particularly when the input alternating voltage is within a wide range of 90 Vac to 265 Vac, the output voltage of the step-up chopper circuit should be set to a value which enables the power-factor improvement operation (maximum alternating input×√2) even when the input alternating voltage have the maximum value. The output voltage should be set to, for example, 370 Vdc to 400 Vdc.

Therefore, even when the input alternating voltage is, for example, 90 Vac, namely, low, the output voltage of the step-up chopper circuit should be stepped-up to 370 Vdc to 400 Vdc by the power-factor improvement operation. For this reason, a step-up ratio becomes large. As a result, as the step-up ratio becomes larger, the loss of the switching element in the step-up chopper circuit becomes larger, and thus a power conversion rate of the step-up chopper circuit is reduced.

Circuits, which enable constant voltage control for the alternating power supply Vin of a low range such as 100 V so that the output voltage Vout becomes an arbitrary voltage within the range of 230 Vdc to 250 Vdc, are desired. The present invention provides a switching power supply device which can improve conversion efficiency without increasing the step-up ratio at the time of the power-factor improvement.

According to a first technical aspect of the present invention, there is provided a switching power supply device for converting an alternating voltage into a DC voltage with a higher amplitude than that of the alternating voltage so as to output high DC voltage, having a switching element for controlling the full-wave rectified alternating voltage into an on/off state, the switching power supply device including: (i) a controller having an error voltage generator for generating an error voltage according to a difference between the output voltage and a first reference voltage and a computing unit for operating a current target value by relating the full-wave rectified alternating voltage with the error voltage, the controller controlling the switching element into a nonconductive state when an electric current flowing in the switching element reaches the current target value; (ii) a comparator for comparing the error voltage with a second reference voltage and outputting a switching signal when the error voltage is higher than the second reference voltage; and (iii) a reference voltage generator for generating the first reference voltage and setting the first reference voltage lower according to the switching signal.

According to a second technical aspect of the present invention, there is provided a switching power supply device for converting an alternating voltage into a DC voltage with a higher amplitude than that of the alternating voltage so as to output the high DC voltage, having a switching element for controlling the full-wave rectified alternating voltage into an on/off state, the switching power supply device including: (i) a controller having an error voltage generator for generating an error voltage according to a difference between the output voltage and a first reference voltage and a computing unit for operating a current target value by relating the full-wave rectified alternating voltage with the error voltage, the controller controlling the switching element into a nonconductive state when an electric current flowing in the switching element reaches the current target value; (ii) a current source for supplying an electric current according to the error voltage; and (iii) a potentiometer for outputting the first reference voltage in which a first resistor and a second resistor are connected in series, one end of the first resistor which is not connected with the second resistor being connected with a third reference voltage, one end of the second resistor which is not connected with the first resistor being grounded, and the current source being connected so as to compose a parallel circuit on a part of the second resistor.

BEST MODE FOR CARRYING OUT THE INVENTION

Exemplary embodiments of the present invention are explained below with reference to the accompanying drawings.

First Embodiment

Figure 1:
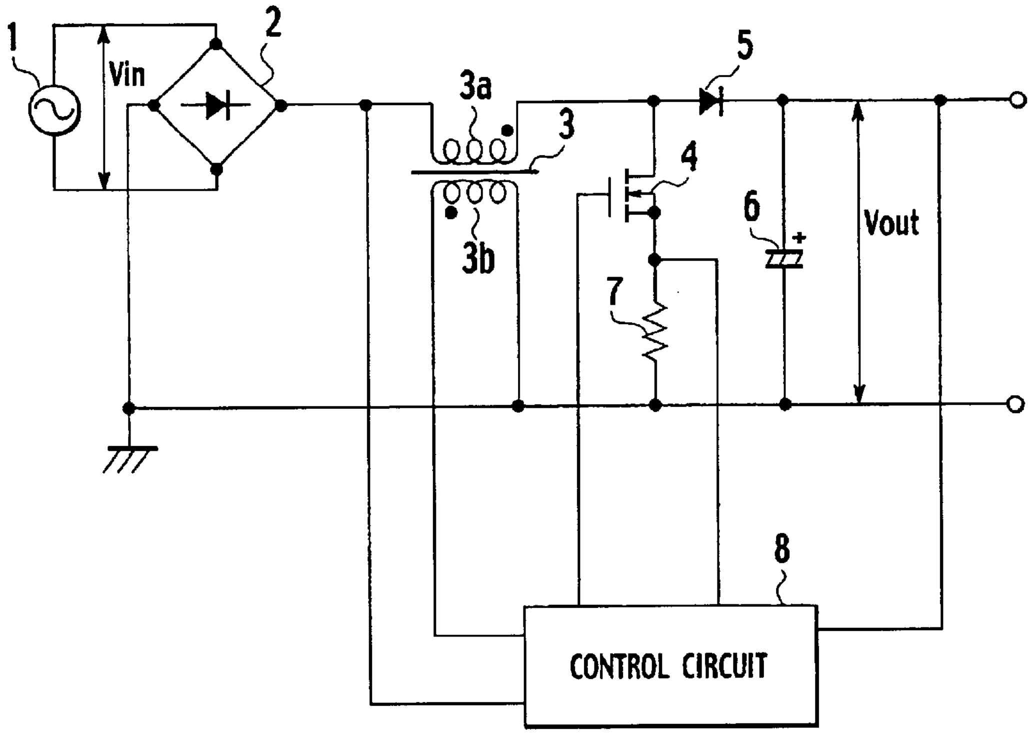
FIG. 1 is a diagram illustrating a configuration of a conventional switching power supply device.
Figure 2:
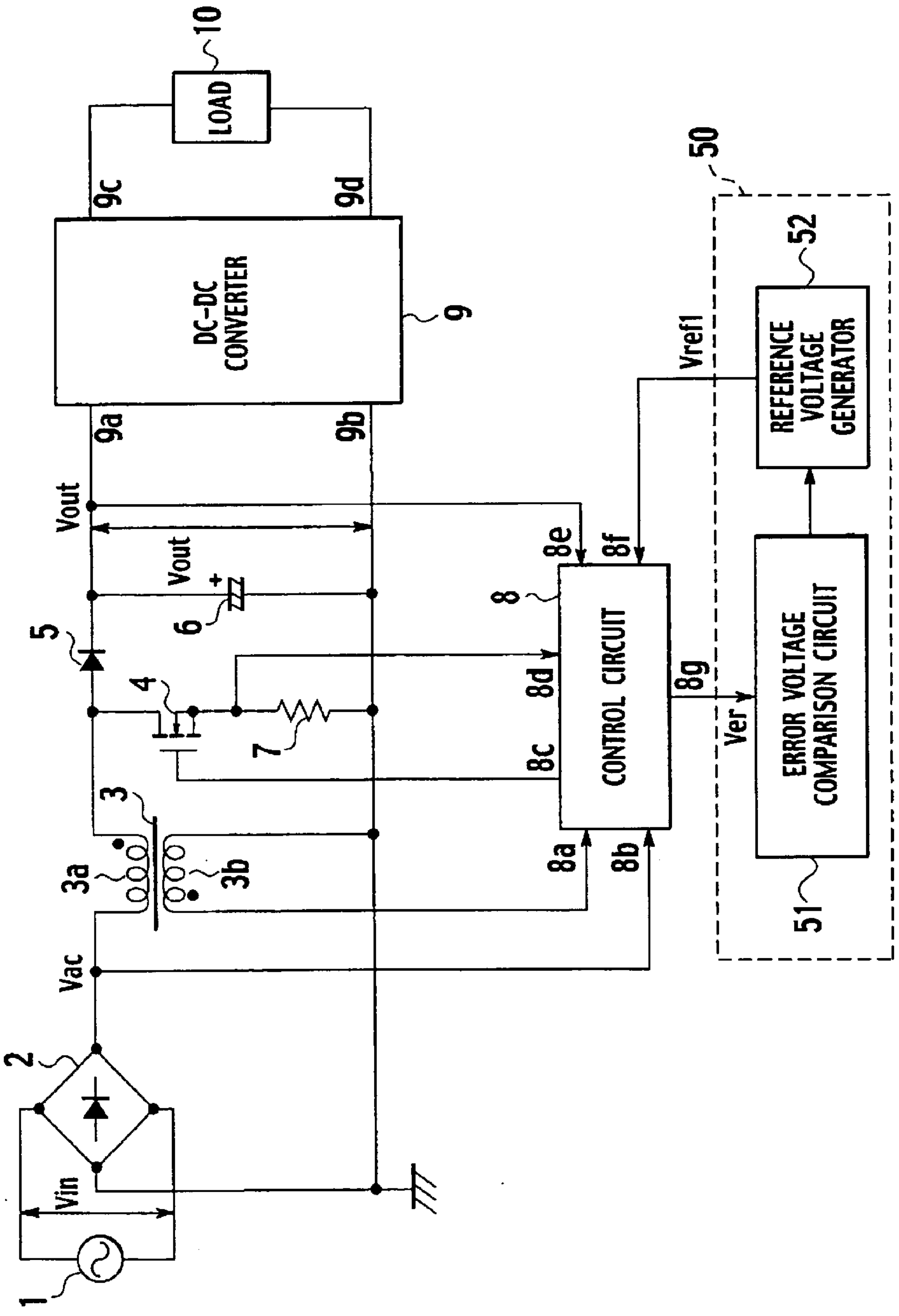
FIG. 2 is a diagram illustrating a configuration of a power-factor improvement circuit adaptable to a switching power supply device according to a first embodiment of the present invention.

FIG. 2 is a diagram illustrating a configuration of a power-factor improvement circuit adaptable to a switching power supply device according to a first embodiment of the present invention. With reference to FIG. 2, the configuration of the power-factor improvement circuit is explained.

The power-factor improvement circuit includes a step-up chopper circuit, and it has a rectifying circuit 2 using a diode bridge, a step-up reactor 3, a switching element 4, an output diode 5, a smoothing capacitor 6, an electric current detection resistor 7, a control circuit 8, an error voltage comparison circuit 51, and a reference voltage generator 52. The power-factor improvement circuit is connected with a DC/DC converter 9 for supplying a DC voltage to a load 10.

The power-factor improvement circuit adopts the step-up chopper circuit as a basic element. The control circuit 8 drives the switching element 4 as a main switch of the step-up chopper circuit, and a rectified pulsating current is chopped so that the circuit is stepped-up.

Figure 3:
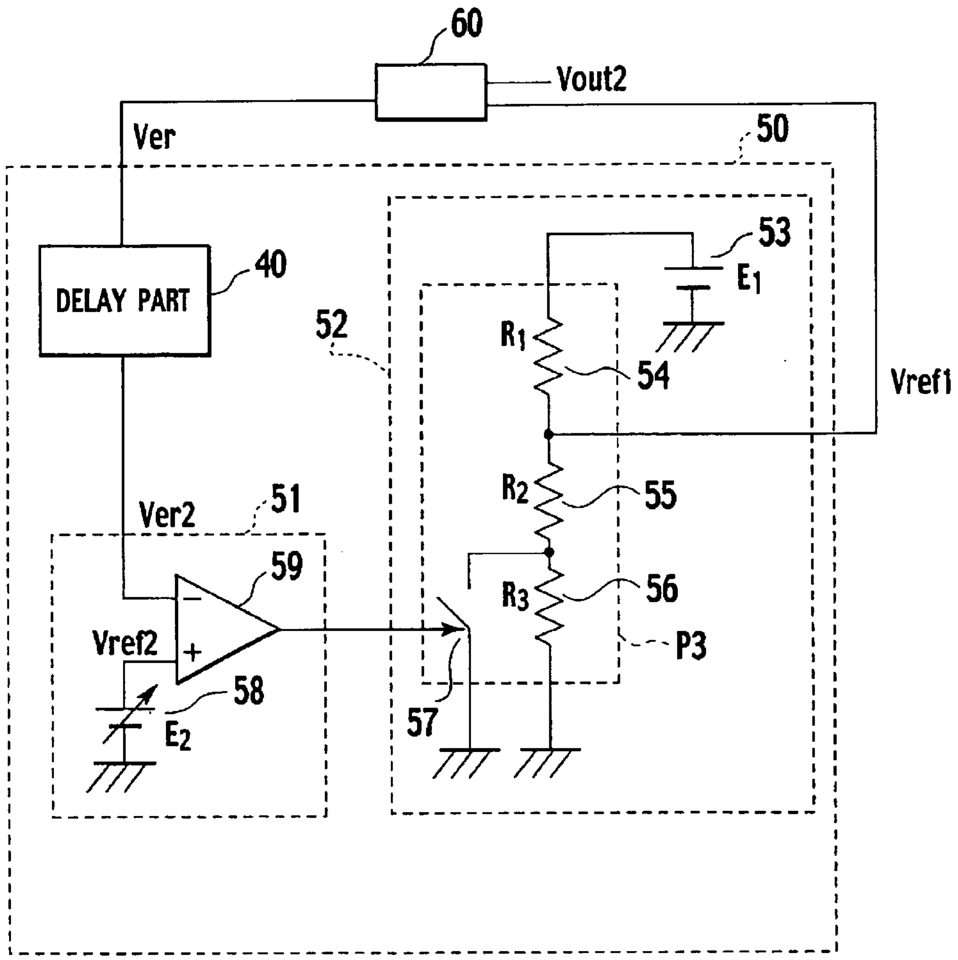
FIG. 3 is a diagram illustrating a configuration of a voltage response type reference voltage generator 50 in FIG. 2.
Figure 4:
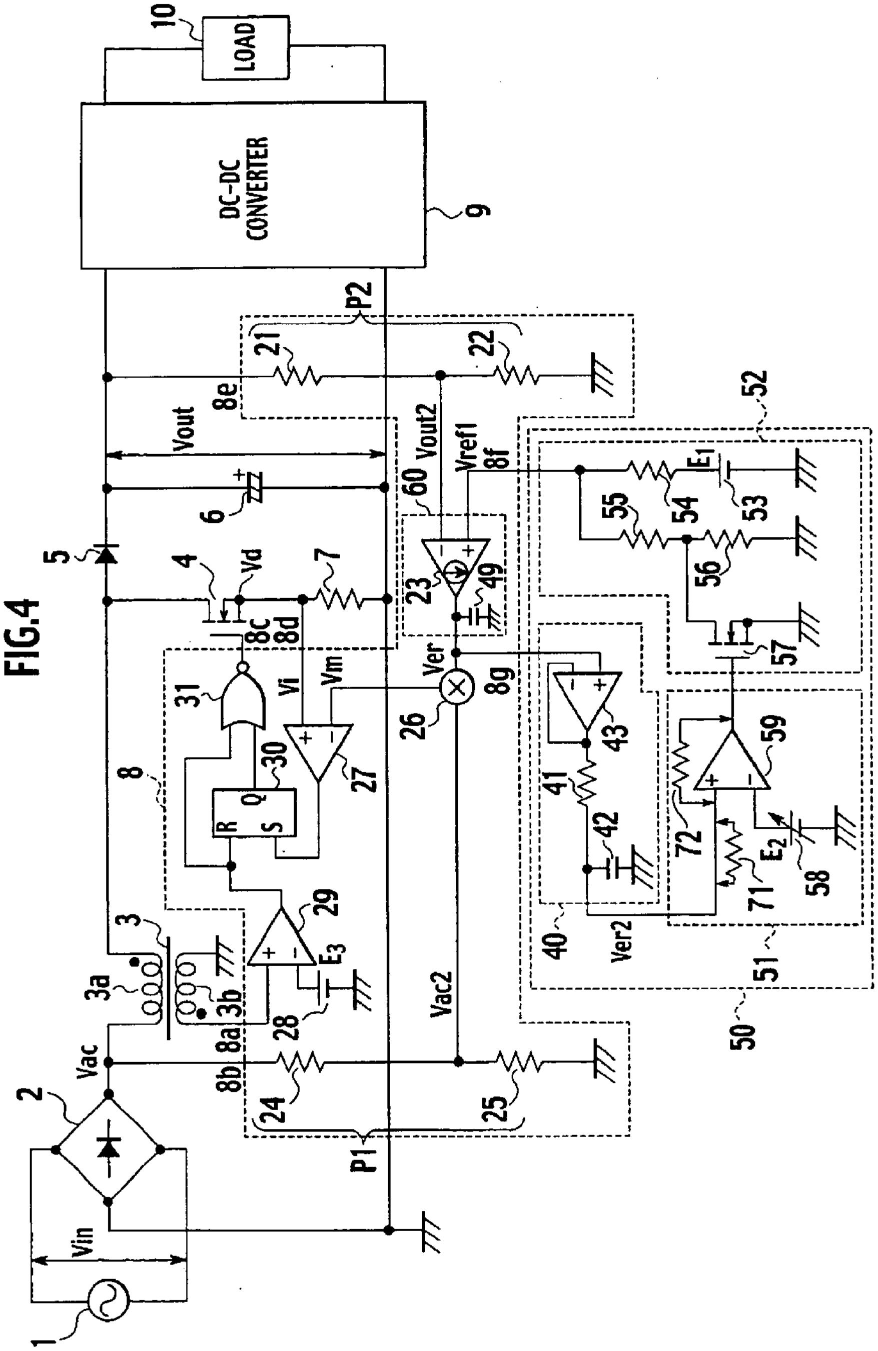
FIG. 4 is a diagram illustrating a detailed configuration of the power-factor improvement circuit adaptable to the switching power supply device according to the first embodiment of the present invention.

In FIGS. 2 to 4, a sinusoidal voltage is supplied from the alternating power supply 1 to the rectifying circuit 2, and the sinusoidal voltage is rectified in full wave by the rectifying circuit 2. The rectified voltage is supplied to the step-up reactor 3 and is also outputted to the control circuit 8. When the main switch 4 is brought into an operative state so as to be conductive, an exciting current flows into a step-up reactor 3*a* connected with the main switch 4 in series so as to increase approximately proportionally to the time. An electromagnetic energy is accumulated on the step-up reactor 3*a*. At this time, since an output voltage as an opposite-direction voltage is applied to the rectifier (output diode) 5, an electric current does not flow therein. The electric current which flows in the main switch 4 is detected by the electric current detector (resistor) 7. When the electric current is compared with a predetermined multiplied result of the control circuit 8 and the electric current reaches a target current value, the main switch 4 is brought into an inoperative state so as to be non-conductive. The multiplying operation is performed by operating a product of an instantaneous value of the input voltage and an output error voltage. When a voltage corresponding to an electric current waveform of the main switch 4 exceeds the multiplied result, therefore, a comparator 27 of the control circuit 8 sets a voltage retainer (RS latch) 30 so that the main switch is brought into a non-conductive state (off).

When the main switch 4 is brought into the non-conductive state, the energy, which is accumulated on the step-up reactor 3 while the main switch is conductive, is supplied to the smoothing capacitor 6 and an output via the rectifier 5. At this time, when a voltage polarity of an auxiliary winding 3*b* of the step-up reactor 3 is inverted and its voltage becomes higher than the reference voltage 28, a zero current detector 29 detects this, so that the voltage retainer (RS latch) 30 is reset. The operation for making the main switch non-conductive is maintained until the accumulated energy of the step-up reactor becomes zero. When emission of the accumulated energy on the step-up reactor is ended, the voltage polarity of the auxiliary winding is again inverted, so that the main switch 4 is conductive. This is the operation process for one cycle.

An amount of the energy accumulated on the step-up reactor 3*a* is adjusted by a conductive period of the main switch 4. That is, in the power-factor improvement operation by the control circuit 8, the conductive period of the main switch 4 is controlled so that the electric current waveform of a power supply line is similar to an input sine wave and the output voltage becomes constant.

Respective circuits are explained in detail below. The step-up reactor 3 is provided with a main winding 3*a* and a critical current detection winding 3*b*. One end of the main winding 3*a* is connected to one output terminal of the rectifying circuit 2, and the other end of the main winding 3*a* is connected to a second output terminal (drain) of the switching element 4 as the main switch and an anode of the output diode 5. Further, one end of the critical current detection winding 3*b* is connected to the control circuit 8, and the other end of the critical current detecting winding 3*b* is grounded. A cathode of the output diode 5 is connected to one end of the smoothing capacitor 6, an input terminal of the DC—DC converter 9, and the control circuit 8.

A control terminal (gate) of the switching element 4 is connected to the control circuit 8 so that a driving signal is applied from the control circuit 8 to the switching element 4, and a first output terminal (source) of the switching element 4 is grounded via the electric current detection resistor 7. A current value detected by the electric current detection resistor 7 is outputted to the control circuit 8. A DC output Vout of the power-factor improvement circuit is input into the DC—DC converter 9 such as a flyback converter, and the DC—DC converter 9 converts the DC voltage input from the power-factor improvement circuit into another DC voltage so as to output it to the load 10.

Figure 8:
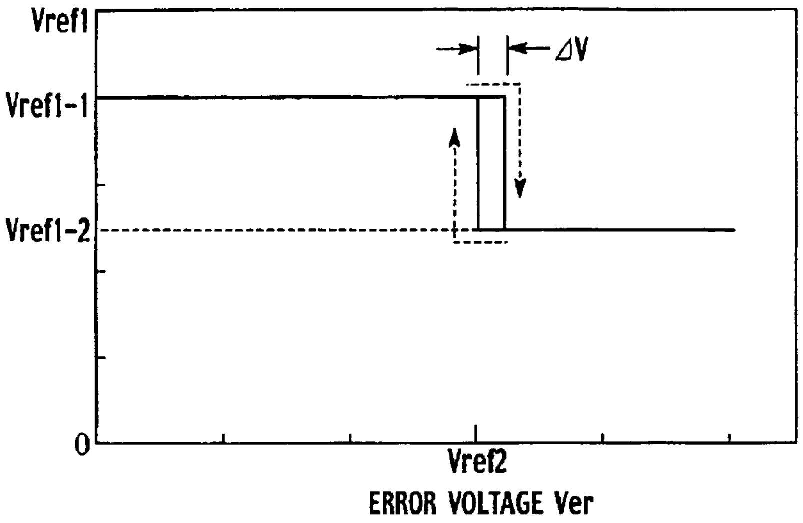
FIG. 8 is a diagram illustrating a relationship between the error voltage Ver and a first reference voltage Vref1.

The power-factor improvement operation is realized in such a manner that the power-factor improvement of the main switch 4 is controlled by the control circuit 8 and a voltage response type reference voltage generator 50. With reference to FIGS. 2 to 4, the control circuit 8 outputs an error voltage Ver between a voltage Vout2, which is proportional to the output voltage Vout being outputted from the power-factor improvement circuit to the DC—DC converter 9, and a first reference voltage Vref1 to the voltage response type reference voltage generator 50. The voltage response type reference voltage generator 50 includes an error voltage comparison circuit 51 and a reference voltage generator 52, and generates a reference voltage Vref1 of an error detector 60, mentioned later, according to the error voltage Ver. The error voltage comparison circuit 51 compares the error voltage Ver output from the control circuit 8 with a second reference voltage Vref2, and outputs an operated result to the reference voltage generator 52. The reference voltage generator 52 generates the first reference voltage Vref1 according to the operated result of the error voltage comparison circuit 51. In this embodiment, when the error voltage Ver exceeds the second reference voltage Vref2, an output voltage from the error voltage comparison circuit 51 is changed from a low level to a high level. The reference voltage generator 52, accordingly, changes an output from a high level voltage Vref-1 into a low level voltage Vref1-2 as shown in FIG. 8. A delay part 40 delays a phase of the input error voltage Ver and masks a change in the error voltage Ver from the time when the output voltage is started to be switched to the time when the switching is completed. As a result, since the error voltage Ver is delayed without changing its amplitude so that it is outputted as an error voltage Ver2, the operation of the error comparison circuit 51 becomes stable. In the following explanation, the error voltage Ver and the error voltage Ver2 are explained as equivalent voltage signals except for a necessary case.

FIG. 4 is a diagram illustrating a detailed configuration of the power-factor improvement circuit adaptable to the switching power supply device according to the first embodiment of the present invention. With reference to FIG. 4, the configuration of power-factor improvement circuit is detailed.

When a voltage generated on the critical current detection winding 3*b* which is input into a plus input terminal (+) of a comparator 29 becomes lower than a reference voltage 28, the control circuit 8 applies a low level set signal to one input of an NOR circuit 31. Since a Q terminal of an RS flip-flop 30 connected to the other input of the NOR circuit 31 is in a low level, a high level voltage is outputted from an output terminal of the NOR circuit 31, so that the switching element 4 is turned on.

The control circuit 8 makes a differential amplifier as an error detector 60 (conductance amplifier 23) generate an error voltage Ver between a voltage Vout2 obtained by dividing the output voltage Vout using resistors 21 and 22 and the reference voltage Vref1 from the reference voltage generator 52. A multiplier 26 multiplies a voltage Vac2, which is obtained by dividing an alternating full-wave rectified waveform Vac using resistors 24 and 25, and the error voltage Ver, so that a current target value Vm which is cooperative with the full-wave rectified waveform is obtained. When a voltage converted value Vi of the switching current in the switching element 4 detected by the electric current detection resistor 7 reaches the current target value Vm, the set signal is outputted from the comparator 27 to the RS flip-flop 30. The output terminal Q is set to "1", and a low level voltage is outputted from the NOR circuit 31 to the switching element 4, so that the switching element 4 is turned off. In such a manner, the output voltage Vout is stabilized.

The delay part 40 composes a low-pass filter in the embodiment. In order to prevent an unstable operation at the time of switching the output voltage, the change in the error voltage Ver is masked by a phase delay for the period from the time when the output voltage starts to be switched to the time when the switching is completed. A time constant is set in such a way that a related frequency is lower than a switching frequency at the time of turning on/off the switching element 4 is set. In the embodiment, a resistor 41 and a capacitor 42 are connected to a buffer circuit (operational amplifier) 43. The error voltage Ver output from the error amplifier 60 of the control circuit 8 is inputted into a noninversion input terminal of the buffer circuit 43, and the error voltage Ver is delayed via the resistor 41 and the capacitor 42 so that the error voltage Ver2 is outputted to the error voltage comparison circuit 51.

The error voltage comparison circuit 51 has a comparator 59. The error voltage Ver output from a filter circuit 40 is input into a plus input terminal (+) of the comparator 59, and the error voltage Ver is compared with the reference voltage Vref2 from a minus input terminal (−) connected to a reference voltage supply 58 which can be set variably. When the error voltage Ver is larger than the reference voltage Vref2, a high level signal is outputted to the reference voltage generator 52.

The reference voltage generator 52 has a switching element 57 which is turned on/off according to a signal from the error voltage comparison circuit 51, and a resistance variable potentiometer P3. When a low level voltage is applied to a control terminal (gate) of the switching element 57, the switching element 57 is turned off. A reference voltage Vref1-1, which is obtained by dividing a reference voltage 53 using resistors 54, 55, and 56, is outputted as a reference voltage Vref1 to the conductance amplifier 23. The resistors 54 to 56 compose the resistance variable potentiometer P3. On the other hand, when a high level signal is applied to the control terminal of the switching element 57, the switching element 57 is turned on, so that first output terminal (source) and second output terminal (drain) are conductive. A reference voltage Vref1-2, which is obtained by dividing the output voltage from the reference voltage supply 53 using the resistors 54 and 55, is outputted as the reference voltage Vref1 to the conductance amplifier 23. In the embodiment, the resistor 56 and the switching element 57 compose a variable resistance element, mentioned later, and the output voltage Vref1 from the resistance variable potentiometer P3 changes according to a change in resistance of the variable resistance element.

The reference voltage Vref1-1 and the reference voltage Vref1-2 establish the following relationship:

Vref1-1>Vref1-2

With reference to FIGS. 5 to 9, the operation of the switching power supply device according to the first embodiment of the present invention is explained below.

When a voltage of the alternating power supply 1 is applied to the power-factor improvement circuit, a sinusoidal voltage supplied from the alternating power supply 1 passes through the rectifying circuit 2. The sinusoidal voltage is rectified in full wave by the rectifying circuit 2, and the full-wave rectified waveform is supplied to the power-factor improvement circuit.

Operation at the Time of Actuation

At the time of actuation, the plus input terminal (+) of the comparator 29 is connected to GND via the critical current detection winding 3*b*, and a reference voltage is inputted into the minus input terminal (−) of the comparator 29, so that both the input voltages are compared with each other. Since the voltage at the plus input terminal (+) is relatively lower in the comparator 27 at the time of actuation, a low level ("0" of positive logic) set signal is outputted from the comparator 27 to an S terminal of the RS flip-flop 30.

The RS flip-flop 30 is rest at the time of actuation, and a low level signal is input to both inputs of the NOR circuit 31 according to the reset signal from the comparator 29 connected with the input of the NOR circuit 31. Therefore, the output from the NOR circuit 31 becomes high level ("1" of positive logic). As a result, as shown in FIG. 5 (timing t1), a driving signal (H level) is outputted from the output of the NOR circuit 31, and this level is retained so that the switching element 4 is turned on.

Figure 5:
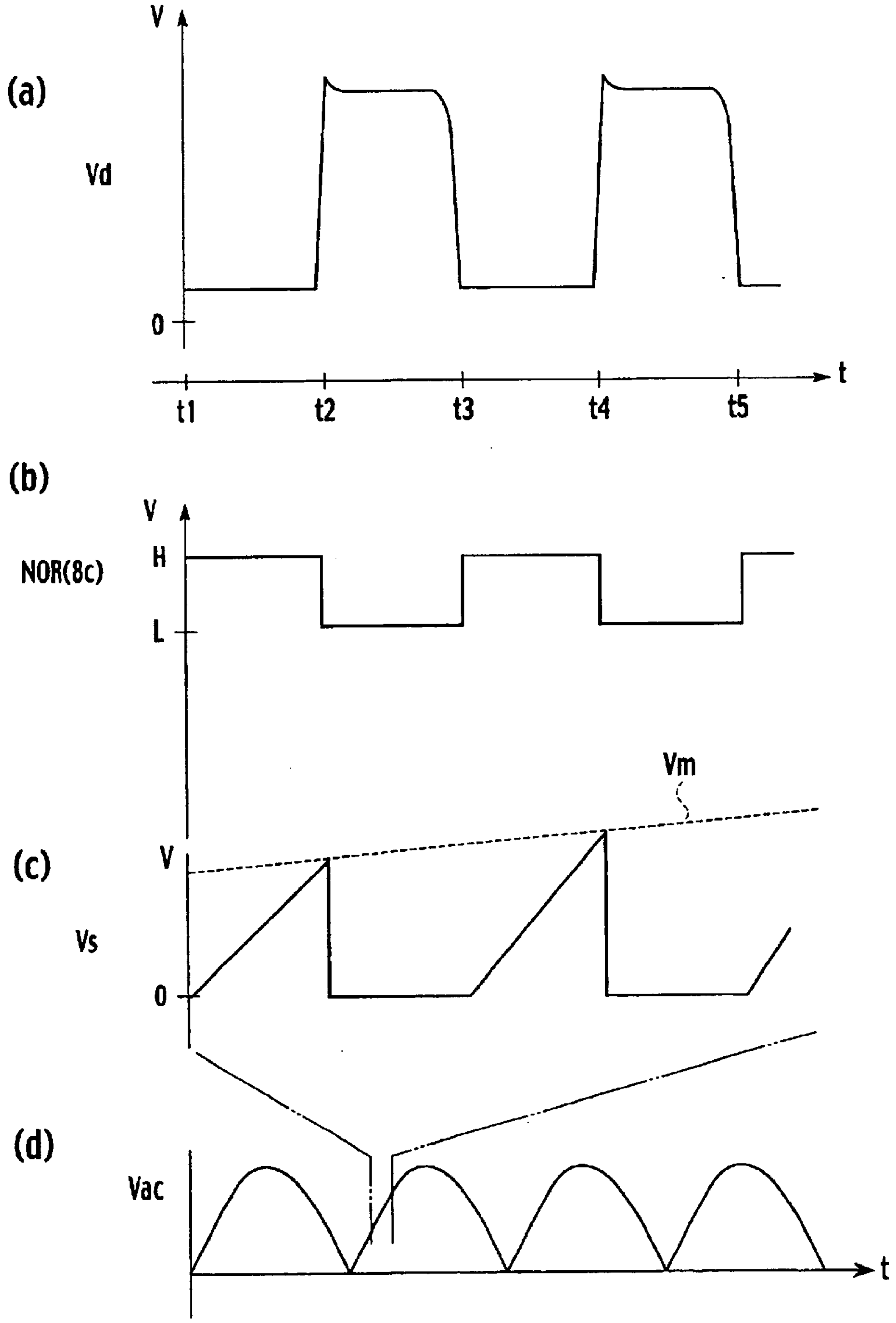
FIGS. 5(*a*) to 5(*d*) are timing charts for explaining an operation of the switching power supply device according to the first embodiment of the present invention, in which (a) represents a voltage Vd between switching element terminals, (b) represents an output of a NOR circuit, (c) represents a voltage Vs between electric current detection resistance terminals, and (d) represents a full-wave rectified waveform Vac.

When the switching element 4 is turned on, as shown in time t1 of FIG. 5(*a*), a voltage Vd at the second output terminal (drain) of the switching element 4 is lowered to nearly 0 V (L level). The switching current flows from the rectifying circuit 2 to GND via the main winding 3*a* and the resistor 7 which detects an electric current flowing through the output of the switching element 4. In such a manner, energy is accumulated on the step-up reactor 3.

The switching current flowing to the switching element 4 at this time is converted into a voltage Vs by the electric current detection resistor 7 provided between the first output terminal (source) of the switching element 4 and GND as shown in FIG. 5(*c*). The voltage Vs is inputted into the plus input terminal (+) of the comparator 27, so as to be compared with the current target value Vm cooperative with the full-wave rectified waveform output from the multiplier 26 by the comparator 27. FIG. 5(*d*) represents the full-wave rectified waveform Vac or Vac2.

Current Target Value Vm

The output voltage Vout from the capacitor 6 is divided as a voltage Vout2 which is proportional to the output voltage Vout by the resistors 21 and 22 composing a potentiometer P2. The voltage Vout2 is input into the minus input terminal (−) of the conductance amplifier 23, and the reference voltage Vref1 from the reference voltage generator 52 is input into the plus input terminal (+) of the conductance amplifier 23. The conductance amplifier 23 operates a difference between the divided value Vout2 of the output voltage Vout supplied from the potentiometer P2 (21, 22) and the reference voltage Vref1, and the difference is outputted to the first input of the multiplier 26. A waveform of FIG. 6(*b*) represents the output voltage Vout from the capacitor 6, and a waveform of FIG. 6(*a*) represents the error voltage Ver output from the error detector 60 including the conductance amplifier 23.

On the other hand, a voltage Vac2, which is obtained by dividing the full-wave rectified waveform Vac output from the rectifying circuit 2 using the resistors 24 and 25 composing the potentiometer P1, is inputted into the second input of the multiplier 26.

Figure 6:
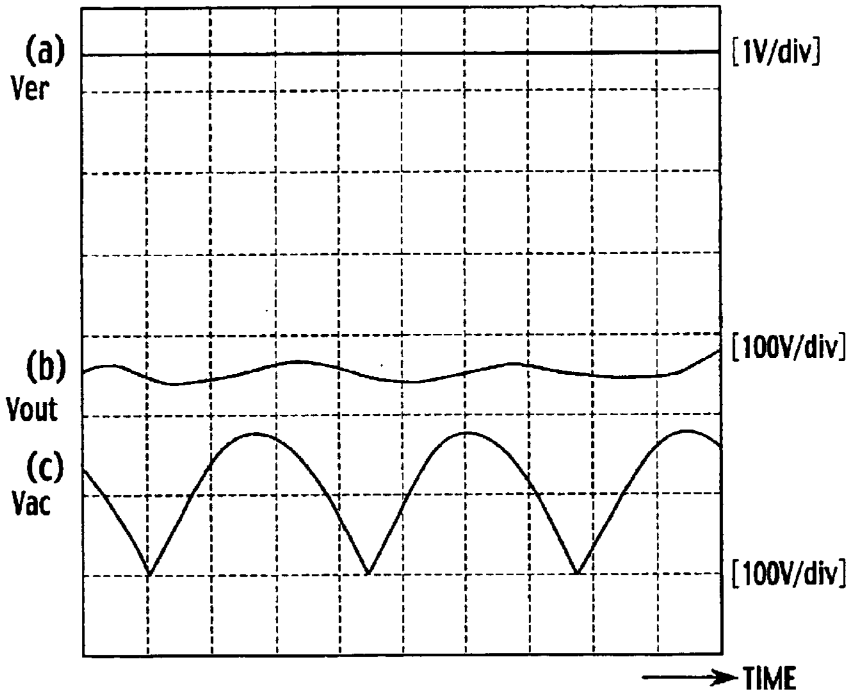
FIG. 6 is a waveform chart of respective sections for explaining the operation of the switching power supply device according to the first embodiment of the present invention, in which (a) represents an output Ver of an error amplifier, (b) represents a DC output Vout of the power-factor improvement circuit, and (c) represents a full-wave rectified waveform Vac, and an abscissa axis represents time t.

A waveform of FIG. 6(*c*) represents the full-wave rectified waveform output from the rectifying circuit 2, and has a frequency which is twice as high as a frequency of the commercial power supply 1.

The multiplier 26 multiplies the error voltage Ver from the error detector 60 (conductance amplifier 23) and the full-wave rectified waveform Vac2 from the rectifying circuit 2 so as to generate a voltage Vm. The voltage Vm is supplied as the current target value Vm cooperative with the full-wave rectified waveform Vac to the minus input terminal (−) of the comparator 27. FIG. 5(*c*) represents the current target value Vm in a time area where the full-wave rectified waveform of FIG. 5(*d*) increases.

OFF Control of Switching Element

With reference to FIGS. 5(*a*) to 5(*d*), when the current detection value Vi(=Vs) of the switching current reaches the current target value Vm cooperative with the full-wave rectified waveform at time t2, the high level set signal is outputted from the comparator 27 to a set input terminal S of the RS flip-flop 30. When the RS flip-flop 30 is set according to the set signal input from the comparator 27, a low level electric potential output from the Q output terminal is switched into a high level electric potential. The output from the NOR circuit 31, therefore, switches the high level driving signal for bringing the switching element 4 into the operational state into the low level driving signal for bringing the switching element 4 into the inoperative state, therefore, the switching element 4 is controlled so as to be brought into the off state.

When the switching element 4 is turned off, the energy accumulated on the step-up reactor 3 is composited with the voltage supplied from the rectifying circuit 2. A transient electric current is charged to the output capacitor 6 via the rectifier 5, so that the voltage Vout rises. The voltage which is induced to the critical voltage detection auxiliary winding 3*b* of the step-up reactor 3 is inverted and rises. The output from the comparator 29 is, therefore, in high level, and thus the RS flip-flop 20 is reset. At the same time, the output from the NOR circuit is maintained in low level. Since the input terminal connected with the comparator 29 of the NOR circuit 31 is in high level, the electric current of the step-up reactor becomes substantially zero, and the switching element 4 is maintained in the inoperative state until the output from the comparator is inverted.

As a result, the voltage which is higher than a peak value of the full-wave rectified waveform supplied from the rectifying circuit 2 is supplied to the output capacitor 6.

ON Control of Switching Element

When the emission of the energy accumulated on the step-up reactor 3 is ended, an induction voltage of the critical current detection winding 3*b* is inverted. The comparator 29 compares this voltage with the reference voltage 28, and a low level reset signal is outputted from the comparator 29 to the reset terminal R of the RS flip-flop 30 and the NOR circuit 31 at time t3. As a result, since the RS flip-flop 30 is already reset at time t3, a high level voltage is outputted from the NOR circuit 31, so that the switching element 4 is again in the operative state.

The above operation is repeated so that the output voltage generated at the output capacitor 6 of the power-factor improvement circuit is maintained constant. As shown in FIG. 5(*c*), the current target value Vm corresponding to the full-wave rectifying value Vac as an absolute value of the voltage Vin in the alternating power supply controls the switching current. As a result, the switching current becomes the sinusoidal current waveform which tracks the voltage Vin of the alternating power supply 1, so that the power factor is improved.

Operation of Conductance Amplifier

As shown in FIG. 5, at the time t2, the driving signal being inputted into a control terminal G of the switching element 4 is switched from H level into L level so that the switching element 4 is brought into the off state. The time t2 matches the point in time at which the input electric current which flows in the resistor 7 reaches its current target value so as to be cooperative with the full-wave rectified waveform of the alternating input voltage. The waveform of a voltage Vi which reflects the input electric current flowing in the resistor 7 is, therefore, adjusted to a certain level according to behavior of the output voltage Vout.

The conductance amplifier 23 makes such level adjustment, and the output voltage Vout from the output capacitor 6 is converted into a divided value Vout2 of the resistors 21 and 22 composing the potentiometer P2 so as to be input into the minus input terminal (−) of the conductance amplifier 23, and the divided value Vout2 is compared with the reference voltage Vref1.

The conductance amplifier 23 biases an electric current corresponding to a differential voltage between the voltage Vout2 proportional to the output voltage Vout and the reference voltage Vref1 so as to output the biased electric current. When the voltage Vout2 is higher than the reference voltage Vref1, a low nonnegative error voltage Ver is outputted, and when the voltage Vout2 is lower than the reference voltage Vref1, a high nonnegative error voltage Ver is outputted. More concretely, the output electric current from the conductance amplifier 23 is integrated (averaged) by a capacitor 49, and the wave-filtered error voltage Ver is generated. The conductance amplifier 23 and the capacitor 49, therefore, compose the error amplifier 60 which detects an error of the average value of the output voltage Vout with respect to the reference voltage Vref1.

The multiplier 26 multiplies the error voltage Ver by the full-wave rectified waveform Vac2 of the alternating input voltage, and outputs the multiplied value as the current target value Vm to the first input terminal (−) of the comparator 27. The multiplier 26, therefore, weights (relates) the full-wave rectified waveform Vac with the error voltage Ver corresponding to the output voltage Vout so as to negatively feedback the output voltage. For example, when the output voltage Vout from the capacitor 6 is higher, the error voltage Ver from the conductance amplifier 23 becomes low. At this time, the multiplier 26 weights the error output Ver with the full-wave rectified waveform of the alternating input voltage, so that the level Vm of the weighted full-wave rectified waveform becomes small, thus, the current target value Vm to be inputted to the comparator 27 is set small, and thus the switching element 4 is turned off earlier, so that the output voltage Vout is reduced.

Reference Voltage Vref1 Outputted from Reference Voltage Generator 52

Figure 7:
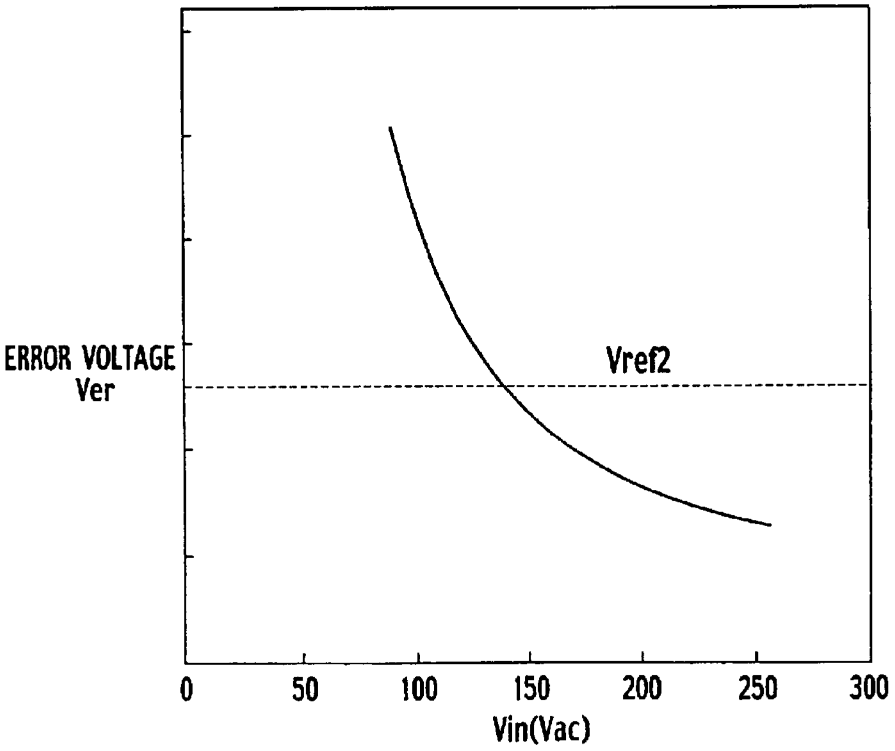
FIG. 7 is a diagram illustrating dependence between the error voltage Ver and the input alternating power supply at the time of rated load.

At the time of rated output, when the alternating voltage Vin sequentially rises from, for example, 90 V to 250 V, as shown in FIG. 7, the error voltage Ver to be outputted from the conductance amplifier 23 has a characteristic such that it draws a down curve.

The reference voltage Vref1 input to the plus input terminal of the conductance amplifier 23 is provided as the output voltage of the resistance variable potentiometer P3 connected to the voltage supply 53 for outputting a predetermined voltage E1. Some of the resistance elements composing the resistance variable potentiometer P3 include variable resistance elements, and the variable resistance elements have resistance according to the error voltage Ver. In the embodiment, the resistor variable potentiometer P3 includes the resistors 54, 55 and 56, and the resistor 56 and the switching element (transistor) 57 which is connected in parallel to both ends of the resistor 56 compose the variable resistance elements. That is, since the resistor 56, the other end of which is grounded, is selectively bypassed by the switching element 57, the output voltage Vref1 of the resistance variable potentiometer P3 changes accordingly. Each of the variable resistance elements can be set to any portion of the resistors of the variable potentiometer P3. In this case, an analog switch is connected in parallel to both ends of the corresponding portion and the corresponding portion is controlled, so that the variable resistance element is realized. The variable resistance element has a function of selectively outputting two resistances, and the fixed resistor 54 is grounded via the fixed resistor 55. Therefore, the output voltage Vref1 can be set to a predetermined nonnegative value as mentioned later.

The error voltage Ver output from the error amplifier 60 (conductance amplifier 23) is inputted into the plus input terminal of the error voltage comparison circuit 51 via the delay part 40. When the input signal at the plus input terminal becomes higher than a predetermined reference voltage Vref2, the comparator 59 detects this state, so that the high-level signal is outputted to the control terminal of the switching element 57. As a result, the switching element 57 provided in the reference voltage generator 52 is brought into a conductive state, so that the reference voltage Vref1 is switched from Vref1-1 into Vref1-2 as shown in FIG. 8.

Figure 9:
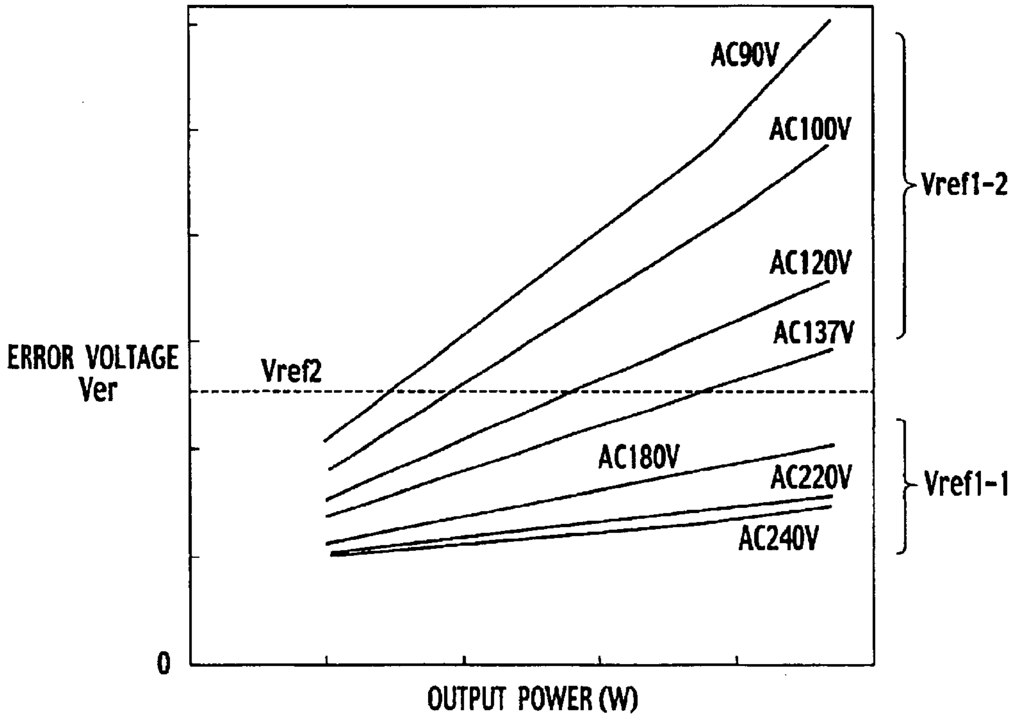
FIG. 9 is a diagram illustrating a relationship between an output power and the first error voltage Ver.

That is, as shown in FIG. 8, when the error voltage Ver outputted from the error amplifier 60 is higher than the reference voltage Vref2, the reference voltage Vref1-2 for enabling the output voltage Vout to be stepped-up between 230 Vdc to 250 Vdc is outputted from the reference voltage generator 52 to the plus input terminal of the conductance amplifier 23 even in the alternating power supply Vin of 100 V as shown in FIG. 9.

As a result, the conductance amplifier 23 is operated by using the reference voltage Vref1-2 for the low-range alternating power supply Vin of 100 V, so that the output voltage Vout can be controlled with a constant voltage so as to be an arbitrary voltage between 230 Vdc to 250 Vdc. For this reason, the step-up ratio of the power-factor improvement circuit does not become excessively large, and thus the conversion efficiency can be improved.

As shown in FIG. 8, when the error voltage Ver output from the error amplifier 60 is lower than the reference voltage Vref2, the reference voltage Vref1-1 for enabling the output voltage to be stepped-up between 370 Vdc to 400 Vdc is outputted from the reference voltage generator 52 to the conductance amplifier 23 even with the alternating power supply 1 of 200 V as shown in FIG. 9.

As a result, the conductance amplifier 23 is operated by using the reference voltage Vref1-1 with the high-range alternating power supply Vin of 200 V, so that the output voltage Vout can be controlled with constant voltage so as to become an arbitrary voltage in a range between 370 Vdc and 400 Vdc. Therefore, the power-factor improvement circuit performs the step-up operation, and thus the power-factor improvement control is enabled.

When the switching voltage from the alternating power supply is set in a range between 140 Vac to 170 Vac which does not correspond to either of the low-range 100 V and the high-range 200 V alternating inputs, even when the alternating power supply Vin to be inputted is, for example, a maximum switching voltage (170 Vac), the output voltage Vout enables the step-up operation. For this reason, the power-factor improvement operation can be performed even near the switching voltage, so that the quality of the power supply is improved.

As shown in FIG. 8, the error voltage comparison circuit 51 may have a hysteresis characteristic between the rise process and the drop process of the error voltage Ver. For example, a feedback resistor 72 is connected between the plus input terminal and the output terminal of the comparator 59, and an input resistor 71 is inserted between the line and the plus input terminal of the error signal Ver. As a result, when the error voltage Ver drops and is lower than the reference voltage Vref2, the reference voltage Vref1-2 is switched into Vref1-1, and when the error voltage Ver rises and is higher than a reference voltage Vref2+ΔV, the reference voltage Vref1-1 is switched into Vref1-2. Therefore, a malfunction due to a noise or the like can be prevented. Similarly, the error voltage comparison circuit 51 can have a hysteresis characteristic with respect to the reference voltage Vref2.

The delay part 40 for delaying the error voltage Ver generated by the control circuit 8 is provided between the control circuit 8 and the error voltage comparison circuit 51, so as to perform a stable switching operation.

Characteristic Operation in the Embodiment

According to the embodiment, when the load increases and the output voltage Vout drops, the error voltage Ver outputted from the error amplifier 60 becomes lower. On the other hand, when the error voltage Ver rises and exceeds the reference voltage Vref2, the comparator 59 outputs the high-level switching signal to the transistor 57 as the switching element, so that the transistor 57 is turned on. As a result, since the resistor 56 is bypassed, the reference voltage Vref1 input into the conductance amplifier 23 is switched from the reference voltage Vref1-1 into Vref1-2.

When the reference voltage Vref1 drops, a fluctuation in the error voltage Ver output from the error amplifier 60 becomes small. Therefore, the comparator 27 outputs the set signal earlier, and thus the switching element 4 is turned off earlier. As a result, since the output voltage Vout becomes low, the output voltage Vout is controlled with constant voltage so as to be an arbitrary voltage in a range between, for example, 230 Vdc to 250 Vdc even with the alternating power supply Vin of 100 V with small amplitude. The step-up ratio of the power-factor improvement circuit does not increase, and the switching loss reduces so that the conversion efficiency can be improved.

Second Embodiment

Figure 10:
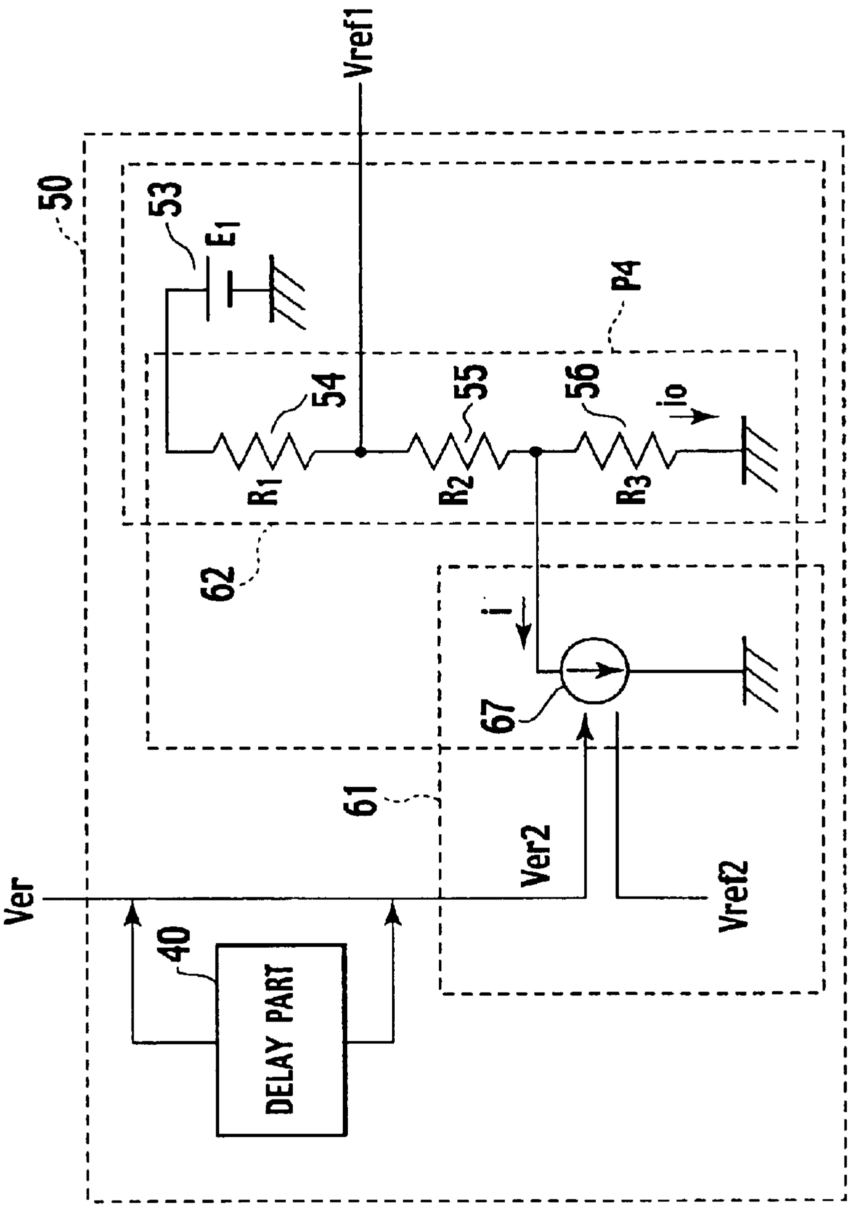
FIG. 10 is a diagram illustrating a configuration of a voltage response type reference voltage generator of a power-factor improvement circuit adaptable to a switching power supply device according to a second embodiment of the present invention.

FIG. 10 is a diagram illustrating a configuration of a voltage adaptive reference voltage generator 50 of the power-factor improvement circuit adaptable to the switching power supply device according to a second embodiment of the present invention. With reference to FIG. 10, the configuration of the power-factor improvement circuit is explained. In the embodiment, since parts other than the configuration of the voltage adaptive reference voltage generator 50 are the same as the basic configuration according to the first embodiment, the explanation thereof is omitted.

The characteristics of the embodiment is such that an error voltage/impedance converter 61 and a reference voltage generator 62 are provided instead of the error voltage comparison circuit 51 and the reference voltage generator 52 provided in the first embodiment.

The error voltage/impedance converter 61 is a voltage controlled register having a current source 67 which inputs the error voltage Ver so as to generate impedance according to a voltage level of the error voltage Ver. Although the delay part is omitted in the embodiment, similarly to the first embodiment, the delay part 40 which delays the error voltage Ver can be provided to the previous stage of the error voltage/impedance converter 61. In the following explanation, an input voltage relating to the error voltage Ver of the error voltage/impedance converter 61 is designated by Ver2.

Impedance of the current source 67 in the error voltage/impedance converter 61 and the resistor 56 connected to it in parallel compose a variable resistor. Similarly to the first embodiment, therefore, the resistors 54, 55 and 56 and the current source 67 as variable impedance element compose a variable resistance potentiometer P4. A voltage, which is obtained by dividing a reference voltage 53 by the variable resistance potentiometer P4, is outputted as the reference voltage Vref1 to the conductance amplifier 23. At this time, the output voltage Vref1 of the variable resistance potentiometer P4 is represented by the following expression (1):

$$Vref1=\{(R_2+R_3)E_1-iR_1R_3\}/(R_1+R_2+R_3) \quad (1)$$

The current value i is a supply current of the current source 67, and is a function of the error voltage Ver1 as mentioned later. When the current source has high impedance and a driving current i is substantially zero (null), the reference voltage becomes:

$$Vref1\text{-}1=E_1(R_2+R_3)/(R_1+R_2+R_3) \quad (2)$$

Further, when the current source has low impedance and the substantially conductive state is obtained, the reference voltage becomes:

$$Vref1\text{-}2=E_1R_2/(R_1+R_2) \quad (3)$$

In this case, since a predetermined voltage Vref1-2 is realized by presence of the resistor 55 (resistance $R_2$), as represented by the expressions (2) and (3), an upper limit and a lower limit of the reference voltage Vref1 can be set.

Figure 11:
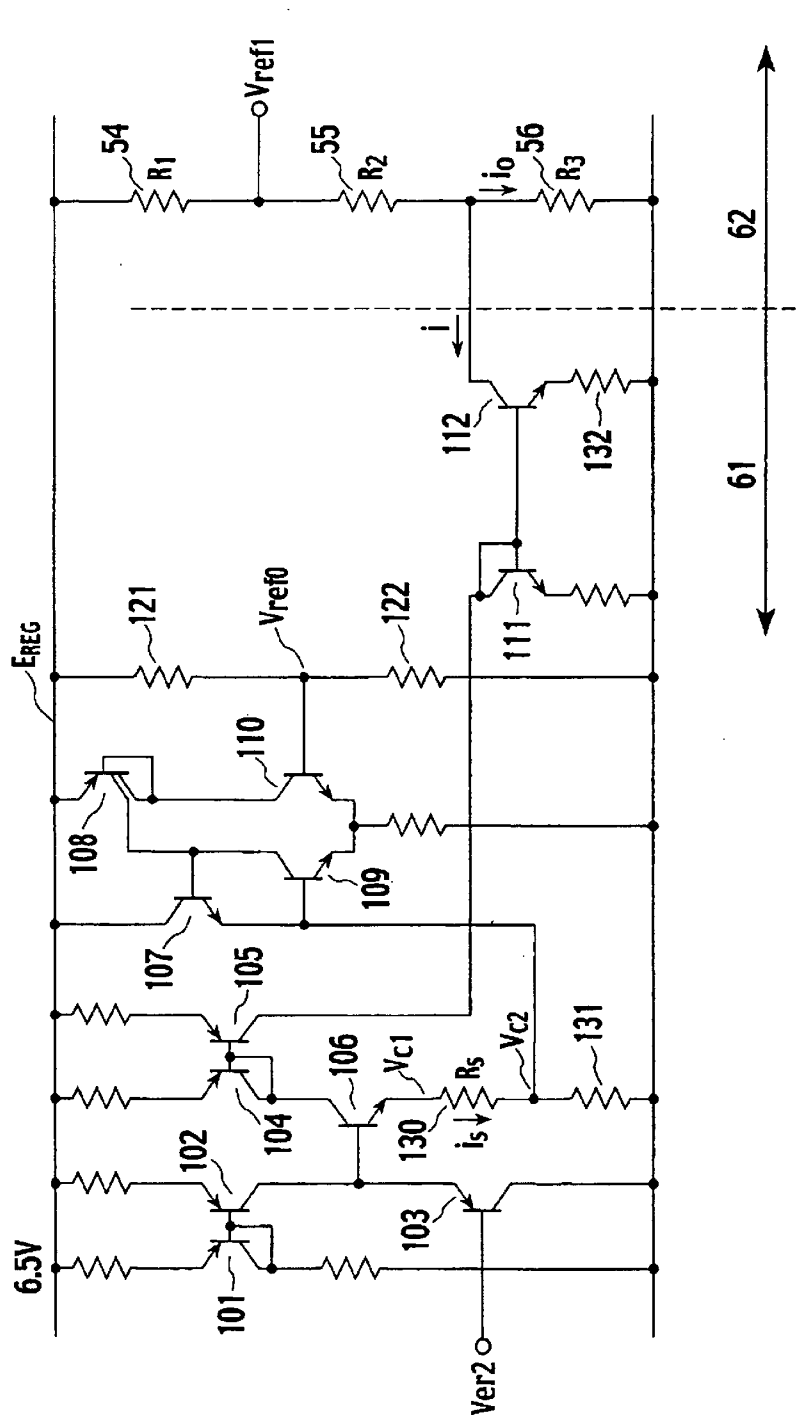
FIG. 11 is a diagram illustrating a detailed configuration of the voltage response type reference voltage generator in FIG. 10.

More specifically, with reference to FIG. 11, the error voltage/impedance converter 61 has the voltage control type current source 67. That is, the current source 67 is a variable impedance element where the impedance changes according to a difference between the error voltage Ver2 and the reference voltage Vref2. When the reference voltage Vref2 is constant, the current value i of the current source 67 is a function of only the error voltage Ver2.

FIG. 11 is a diagram illustrating examples of the error voltage/impedance converter 61 and the reference voltage generator 62 according to the second embodiment of the present invention. When the error voltage Ver or Ver2 is inputted into a base of a transistor 103, a voltage to which a base-emitter forward direction voltage is added is generated at the emitter of the transistor 103. Transistors 101 and 102 compose a current mirror circuit which applies an operating current to the transistor 103. Since a voltage Vc1 from which only a base-emitter forward direction voltage is subtracted is generated on an emitter of a transistor 106, the voltage Vc1 is equal with the error voltage Ver2. The emitter of the transistor 106 is grounded via resistors 130 and 131 connected in series. Further, a connecting point between the resistors 130 and 131 is connected to an emitter of a transistor 107 and a base of a transistor 109. A differential amplifier configured by the transistors 108 to 110 controls the emitter of the transistor 107 and the base of the transistor 109 so that they have a voltage equal with that at the base of the transistor 110. Meanwhile, resistors 121 and 122 provide a voltage Vref0 obtained by dividing a constant-voltage power supply $E_{REG}$ to the base of the transistor 110. The transistors 107 to 110 and the resistors 121 and 122, therefore, compose a voltage source for outputting the voltage Vc2 equal with the divided voltage Vref0 from the emitter of the transistor 107 and the base of the transistor 109.

As a result, the voltage Vc1 which is equal with the error voltage Ver2 and the constant voltage Vc2 as the reference voltage Vref2 are applied to both ends of the resistor 130. That is, the electric current $i_s$ flows in the resistor 130 in such that $i_s$(Ver2)=(Vc1−Vc2)/Rs=(Ver2−Vref2)/Rs. The electric current $i_s$ a function of the error voltage Ver2, and changes proportionally to the error voltage Ver2. Since the transistors

104 and 105 compose the current mirror circuit, the electric current $i_s$ which flows in the transistor 106 flows also in the transistor 104. The electric current $i_s$ flows also between collector and emitter of a transistor 111 via the transistor 105. Further, since the transistors 111 and 112 compose the current mirror circuit, the same current i as the current $i_s$ flows also between collector and emitter of the transistor 112. The error voltage/impedance converter 61 in FIG. 11, therefore, composes the voltage controlled current source 67 where the electric current i changes in response to the error voltage Ver2. When the error voltage Ver2 is lower than the reference voltage Vref2, the transistor 106 is brought into inoperative state and into nonconductive state, and thus the electric current is not supplied from the current source. When the error voltage Ver2 is lower than the reference voltage Vref2, therefore, equivalent impedance becomes high, and the electric current is substantially cut off. The supply current i(Ver2) becomes as follows:

$$i(Ver2)=0 \quad (4)$$

Further, when the error voltage Ver2 is higher than the reference voltage Vref2, the supply current i becomes as follows:

$$i(Ver2)=(Ver2-Vref2)/Rs \quad (5)$$

Since the voltage control type current source 67 divides the electric current flowing in the reference voltage generator 62, the reference voltage Vref1 is variable according to the value of the error voltage Ver2 or Ver as represented by the expression (1).

Figure 12:
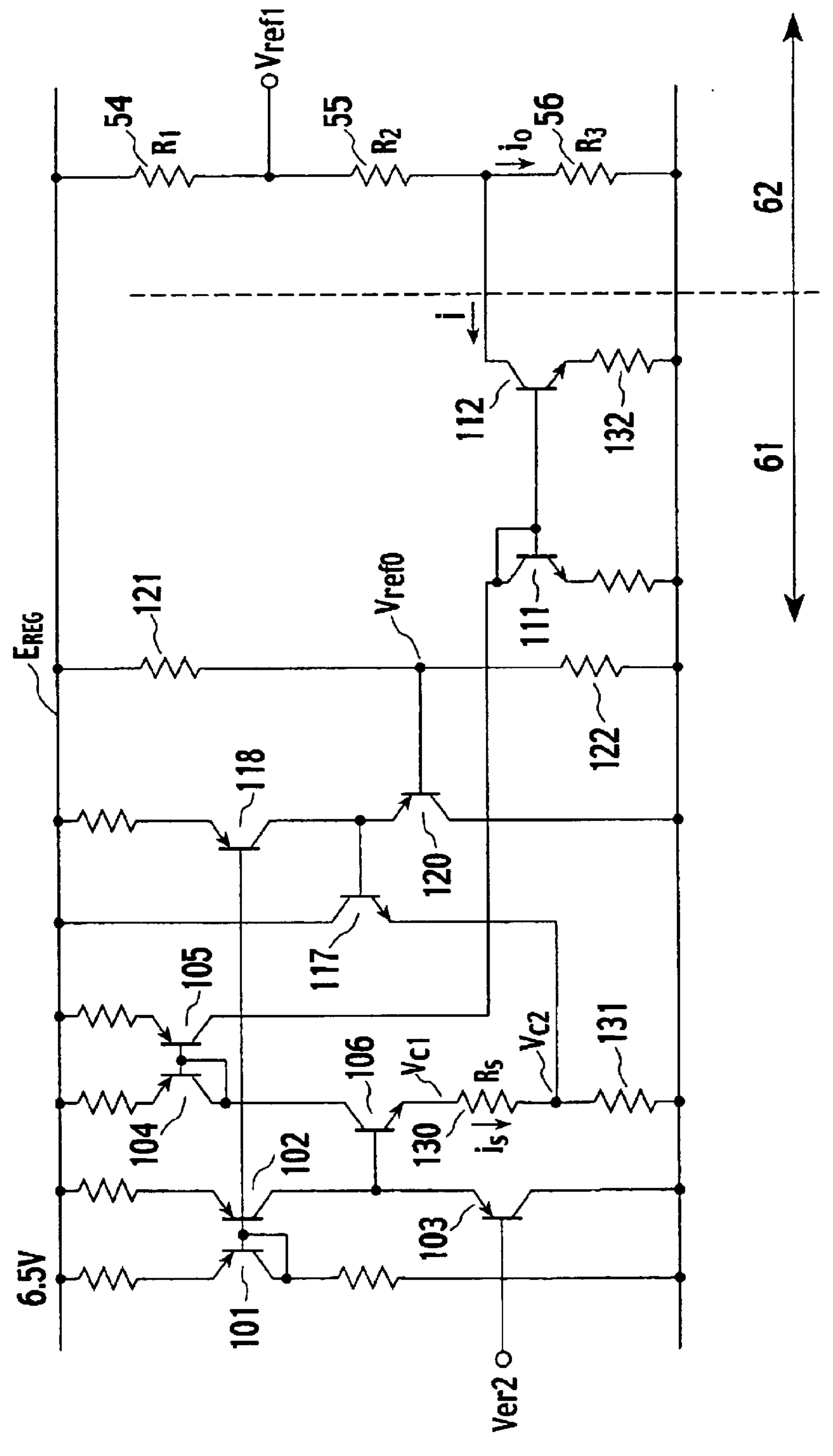
FIG. 12 is a diagram illustrating a detailed configuration of the voltage response type reference voltage generator in FIG. 10 according to a modified embodiment.

FIG. 12 is a diagram illustrating another example of the error voltage/impedance converter 61 and the reference voltage generator 62 according to the second embodiment of the present invention. This example is different from the example in FIG. 11 only in the configuration of the constant voltage supply. The resistors 121 and 122 provide a voltage Vref0 which is obtained by dividing the constant voltage power supply $E_{REG}$ to the base of the transistor 120. The transistors 101 and 118 compose the current mirror circuit which supplies an operating current to the transistor 120. The voltage at the emitter of the transistor 120 is higher than a base voltage by the base-emitter forward direction voltage, and the voltage at the emitter of the transistor 117 is lower than the base voltage by the base-emitter forward direction voltage. Therefore, the transistors 117, 118 and 120 and the resistors 121 and 122 compose the constant voltage supply which outputs the voltage Vc2 equal with the divided voltage Vref0 from the emitter of the transistor 117. Since the other parts of the configuration and the operation are the same as those in FIG. 11, the explanation thereof is omitted.

With reference to a graph in FIG. 13, the operation of the switching power supply device according to the second embodiment of the present invention is explained below.

When the error voltage Ver2 output from the delay part 40 is input into the error voltage/impedance converter 61, the error voltage/impedance converter 61 converts the voltage into impedance using the current source 67 according to the level of the error voltage Ver2. The resistance according to the level of the error voltage is generated as the resistor 67 so as to be supplied to the reference voltage generator 62. The reference voltage generator 62 outputs the voltage, which is obtained by dividing the reference voltage 53 using the potentiometer P4 including the resistor 67, as the reference voltage Vref1 to the conductance amplifier 23.

When the error voltage Ver2 is lower than the reference voltage Vref2, the current source has high impedance, and it becomes the supply current i(Ver2)=0. Therefore, the output voltage Vref1 (Ver2) becomes a constant voltage represented by the expression (2). Further, when the error voltage Ver2 is higher than the reference voltage Vref2, the electric current i(Ver2) represented by the expression (5) is divided by the current source 67, and thus as the error voltage Ver or Ver2 is higher, higher electric current flows. The output voltage Vref1 (Ver2), therefore, becomes lower as the error voltage Ver or Ver2 is higher as represented by the expression (1). Further, when the error voltage Ver or Ver2 becomes higher and the impedance of the current source becomes low enough to drawn the entire electric current from the resistor 56, the output voltage does not change (see expression (3)).

Figure 13:
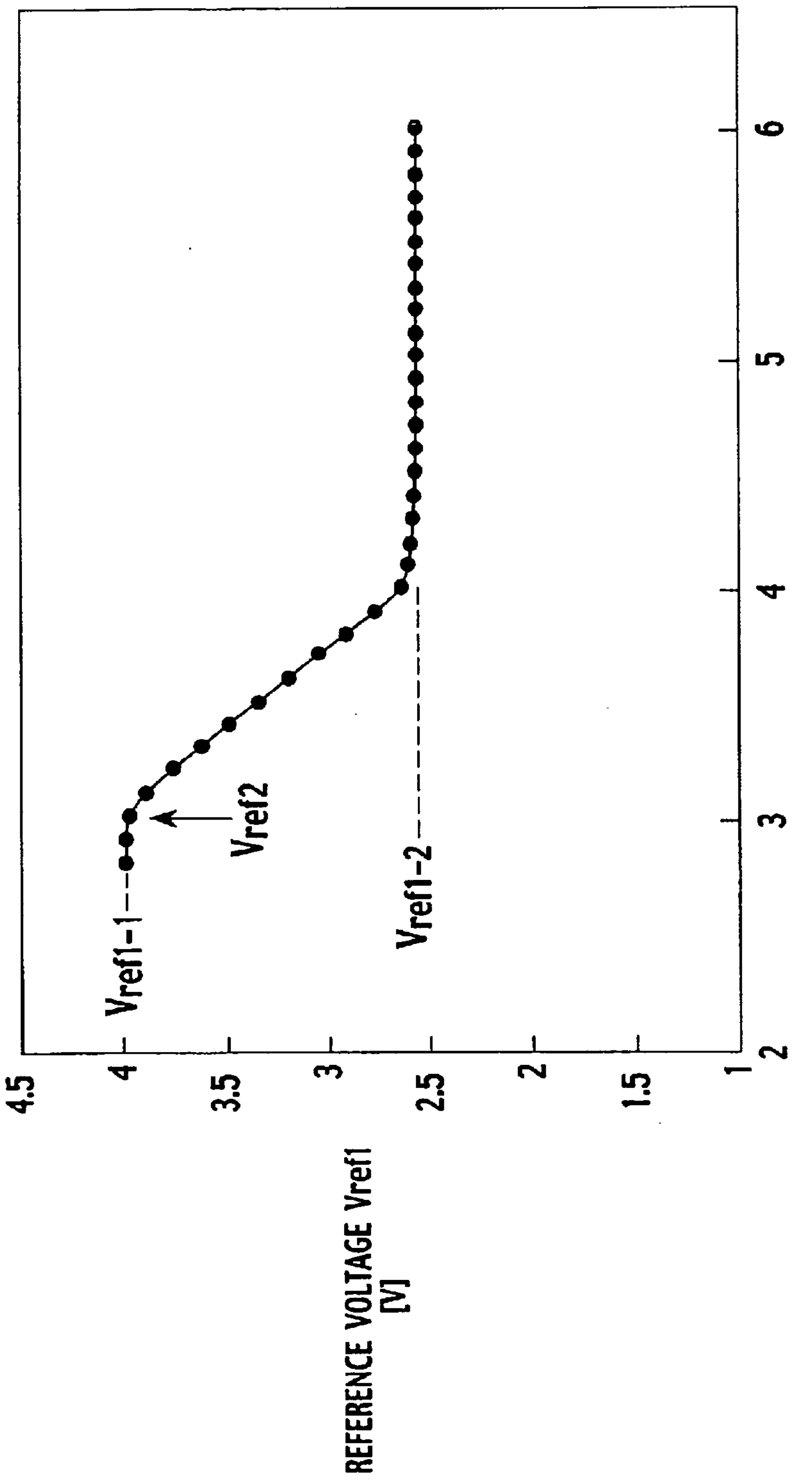
FIG. 13 is a diagram illustrating that the first reference voltage Vref1 sequentially changes with respect to the error voltage Ver.

As shown in FIG. 13, therefore, when the error voltage Ver rises so as to exceed the reference voltage Vref2, the voltage, which gradually drops from the reference voltage Vref1-1 towards Vref1-2 sequentially according to the level of the error voltage Ver, is applied as the reference voltage Vref1 to the conductance amplifier 23. Dots in FIG. 13 represent measured example of the output voltage Vref1 with respect to the input voltage Ver2 of the voltage response type reference voltage generator 50 in FIG. 11.

According to the expression (1) and (5), a gain G with respect to a change in the error voltage Ver or Ver2 of the error voltage/impedance converter 61 becomes as follows:

$$G=-R_1R_3/\{R_s(R_1+R_2+R_3)\} \quad (6)$$

A gradient of the reference voltage Vref1 with respect to the error voltage Ver is related with the gain G, and the gain G has a negative value according to the expression (1). Therefore, the change in the reference voltage Vref1 has reversed polarity with respect to the change in the error voltage Ver or Ver2. As the error voltage Ver becomes higher, therefore, the supply current $i_s$ becomes higher, namely, the equivalent impedance becomes lower. When an absolute value of the gain G becomes small, the gradient of the change in the reference voltage Vref1 with respect to the change in the error voltage Ver becomes smaller.

The error voltage/impedance converter 61 generates resistance which becomes lower as the error voltage Ver becomes higher according to the error voltage Ver. The reference voltage generator 62 generates a first reference voltage Vref1 which becomes lower as the resistance becomes lower. For this reason, the first reference voltage Vref1 which becomes lower as the error voltage Ver becomes higher is used for enabling the control, and the constant voltage control can be performed so that the output voltage Vout becomes lower.

When the reference voltage Vref1 of the conductance amplifier 23 becomes gradually lower, a fluctuation in the error voltage Ver output from the conductance amplifier 23 becomes small. For this reason, the output voltage Vout gradually becomes lower, and thus the output voltage Vout can be controlled with constant voltage for the alternating power supply Vin of a low range such as 100 V so as to become an arbitrary voltage between, for example, 230 Vdc to 250 Vdc. As a result, the step-up ratio of the power-factor improvement circuit does not become large, and the switching loss reduces so that the conversion efficiency can be improved.

The delay part 40 which delays the error voltage Ver generated by the control circuit 8 is provided between the control circuit 8 and the error voltage/impedance converter 61. As a result, the stable constant voltage control can be performed.

The first and the second embodiments explain the critical current operation where the reactor current becomes about OA, but the present invention is not limited to this. The present invention is applicable to a discontinuous control action in which the reactor current is discontinuous, and a continuous control action in which the reactor current is continuous.

The first and the second embodiments explain the case where flyback converter is used as the DC/DC converter 9, but the present invention is not limited to this. The present invention can be applied also to a RCC circuit, a forward converter circuit, a half bridge circuit, a bridge circuit, and the like.

According to a first technical aspect of the present invention, the switching element is controlled by a controller so as to be turned off when the switching current reaches the current target value, and the output voltage is stabilized. When the error voltage is compared with the second reference voltage and the error voltage is higher, the switching signal is outputted so that the reference voltage is switched into another reference voltage lower than the first reference voltage according to the switching signal. The constant voltage control can be, therefore, performed with an output voltage lower than the output voltage at the time of control using the first reference voltage. As a result, the step-up ratio at the time of the power-factor improvement does not become large, and the switching loss reduces so that the conversion efficiency can be improved.

As a result, the output voltage can be reduced at the time of heavy loading in the low-range alternating power supply (100V), and the output voltage can be switched into a higher voltage in the high-range alternating power supply (200V). For this reason, the loss of the switching element can be improved even at the low-range alternating power supply, so that the power conversion rate can be improved. Further, the power-factor improvement operation is enabled even in the low-range and high-range alternating power supplies.

Further, the power supply voltage which is switched from the first reference voltage into another reference voltage corresponds to an approximately intermediate alternating voltage between the low range and the high range. Therefore, the constant voltage control is stabilized at both the alternating power supplies of 100 V and 200V, and thus the quality of the power supply is improved. Further, the power-factor improvement operation can be performed even near the power supply voltage when the first reference voltage is switched into another reference voltage.

Since the first reference voltage is changed by using the error voltage, a malfunction due to a noise can be reduced. Since the number of pins does not increase and a package does not change at the time of configuring an integrated circuit an increase in the cost and enlargement of the package shape can be prevented.

According to a second technical aspect of the present invention, the resistance, which becomes sequentially lower as the error voltage becomes higher, is generated according to the error voltage. The first reference voltage, which becomes sequentially lower as the resistance becomes lower, is generated by the resistance. Since the control circuit can be, therefore, controlled by using the first reference voltage which changes sequentially according to the error voltage, the constant voltage control can be performed so that the output voltage becomes lower more securely. The step-up ratio at the time of the power-factor improvement does not increase, and the switching loss reduces, so that the conversion efficiency can be improved.

What is claimed is:

1. A switching power supply device for converting an alternating voltage into a DC voltage with a higher amplitude than that of the alternating voltage so as to output high DC voltage, the device having a switching element for controlling a full-wave rectified alternating voltage into an on/off state, the switching power supply device comprising:

a controller having an error voltage generator for generating an error voltage according to a difference between the output voltage and a first reference voltage and a computing unit for computing a current target value by relating the full-wave rectified alternating voltage with the error voltage, the controller controlling the switching element into a nonconductive state when an electric current flowing in the switching element reaches the current target value;

a comparator for comparing the error voltage with a second reference voltage and outputting a switching signal when the error voltage is higher than the second reference voltage; and a reference voltage generator for generating the first reference voltage and setting the first reference voltage lower according to the switching signal.

2. The switching power supply device according to claim 1, wherein the comparator has a hysteresis characteristic with respect to the error voltage or the reference voltage.

3. The switching power supply device according to claim 1, comprising a delay part for delaying the error voltage being provided between the controller and the comparator.

4. A switching power supply device for converting an alternating voltage into a DC voltage with a higher amplitude than that of the alternating voltage so as to output high DC voltage, the device having a switching element for controlling a full-wave rectified alternating voltage into an on/off state, the switching power supply device comprising:

a controller having an error voltage generator for generating an error voltage according to a difference between the output voltage and a first reference voltage and a computing unit for operating a current target value by relating the full-wave rectified alternating voltage with the error voltage, the controller controlling the switching element into a nonconductive state when an electric current flowing in the switching element reaches the current target value;

a current source for supplying an electric current according to the error voltage; and a potentiometer for outputting the first reference voltage in which a first resistor and a second resistor are connected in series, one end of the first resistor which is not connected with the second resistor being connected with a third reference voltage, one end of the second resistor which is not connected with the first resistor being grounded, and the current source being connected so as to compose a parallel circuit on a part of the second resistor.

5. The switching power supply device according to claim 4, further comprising a delay part for delaying the error voltage between the controller and the current source.

6. The switching power supply device according to claim 4, wherein the current source supplies an electric current which is proportional to a difference between the error voltage and a second reference voltage.

7. A switching power supply device for converting an alternating voltage into a DC voltage with a higher amplitude than that of the alternating voltage so as to output high DC voltage, the device having a switching element for controlling a full-wave rectified alternating voltage into an on/off state, the switching power supply device comprising:

a controller having an error voltage generator for generating an error voltage according to a difference between the output voltage and a first reference voltage and a computing unit for operating a current target value by relating the full-wave rectified alternating voltage with the error voltage, the controller controlling the switching element into a nonconductive state when an electric current flowing in the switching element reaches the current target value; and a voltage adaptive reference voltage generator for generating the first reference voltage, the generator having a variable resistance element for generating a resistance according to the error voltage and a potentiometer which is connected with a third reference voltage and outputs the first reference voltage, the potentiometer being connected in series with a plurality of resistors including the variable resistance element.

8. The switching power supply device according to claim 6, wherein the variable resistance element has a resistor and a switching element connected with the resistor in parallel, and the switching element is controlled to be opened and closed according to the error voltage.

9. The switching power supply device according to claim 6, wherein the variable resistance element has a resistor and a current source connected with the resistor in parallel, and an electric current at the current source changes according to the error voltage.

* * * * *